J. E. KLEIN.
Thill-Coupling.
No. 224,191  Patented Feb. 3, 1880.
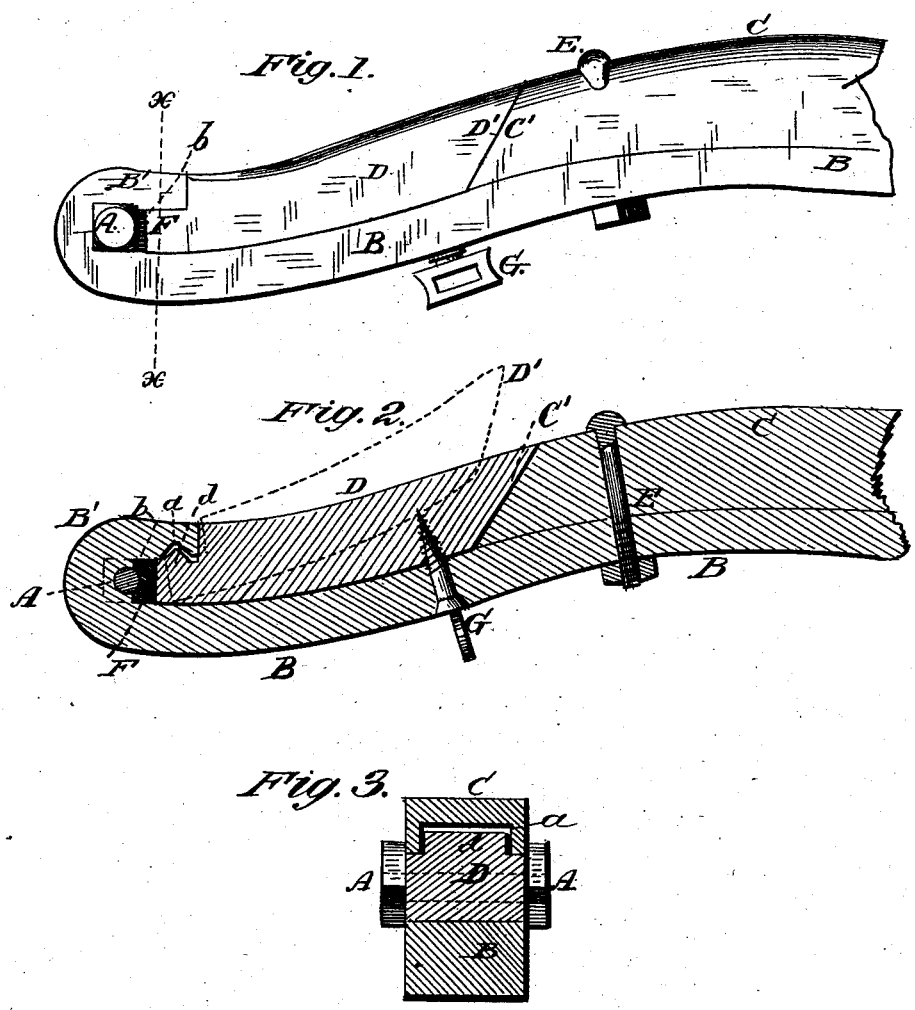

UNITED STATES PATENT OFFICE.

JOHN E. KLEIN, OF OSKALOOSA, IOWA.

THILL-COUPLING.

SPECIFICATION forming part of Letters Patent No. 224,191, dated February 3, 1880.

Application filed September 22, 1879.

*To all whom it may concern:*

Be it known that I, JOHN E. KLEIN, of Oskaloosa, in the county of Mahaska and State of Iowa, have invented certain new and useful Improvements in Thill-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of the rear end of a buggy shaft or thill fitted with my improved coupling. Fig. 2 is a longitudinal section of the same, and Fig. 3 is a cross-section taken on line $x\,x$ in Fig. 1.

Similar letters of reference indicate corresponding parts in all the figures.

The object of this invention is to produce a pole, shaft, or thill coupling for vehicles of any kind, which may be attached to or detached from the coupling-bolt in the axle-clip without the use of a wrench, key, or similar tools to remove the bolt-nut, and which shall be noiseless and consist of few parts, simply put together, so as to be strong, durable, not liable to get out of order, and present a smooth and neat appearance, substantially as hereinafter more fully set forth.

In the drawings, A represents the coupling or clip bolt upon which the pole or thill is hinged, and which is of the usual shape and construction.

B is the shaft-iron, the end of which is recurved, as shown at B', to form a recess, $b$, which surrounds the clip-bolt A. The upper end or lip of the curved part B' has a slot or recess, $a$, into which is inserted the tongue $d$ of a lever, D, the front end of which is beveled or cut off obliquely, as shown at D', so as to impinge upon the slanting rear end or shoulder, C', of the wooden thill-pole or shaft C, which is attached to the shaft-iron B by end bolts, E, as usual.

F is a rubber block or pad, which is inserted into the recess $b$ of the shaft-iron so as to bear directly against the bolt A. By inserting lever D with its tongue $d$ projecting into the slot $a$ of the curved lip B' and its rear end or shoulder abutting against the elastic block F, as indicated by the dotted lines in Fig. 2, and then depressing the forward end of the lever, using its tongue $d$ as a fulcrum, the rubber block is compressed between the end of the lever and the bolt, so as to form a close and snugly-fitting joint, lever D being held in its downward position flush and even with the pole or shaft by a thumb-screw, G, the end or handle of which forms a means of attachment for one end of the safety-strap, the other end of which may be secured in the clip.

From the foregoing description it will be observed that this coupling may be readily and speedily attached to and detached from the clip-bolt without loss of time and without the use of tools of any kind, as the thumb-screw G is loosened and tightened, to manipulate lever D, simply with the fingers. The elastic block or cushion F, bearing directly against the bolt, and being compressed against this by the lever D, takes up wear automatically, and absolutely prevents rattling, causing at the same time the lever to form a tight and close joint with the shaft-iron B and shaft C.

It is obvious that this invention is applicable alike to the pole or shafts of a vehicle, and that the shaft-iron and shaft or pole may have any desired curve, up, down, or sidewise, as expediency may direct.

The lever D need not be on the top, as in the drawings, but may be underneath the shaft or on its side.

Having thus described my invention, I claim and desire to secure by Letters Patent of the United States—

In combination, the thill-pole or shaft C, having oblique shoulder C', shaft-iron B, made with a doubled end or recurved lip, B', provided with the notch $a$, clip-bolt A, elastic block or cushion F, detachable lever D, beveled at D' to fit the oblique shoulder of the thill-pole, and provided at its opposite or rear end with the projecting tongue $d$, and thumb-screw G, the whole constructed and combined substantially in the manner and for the purpose herein shown and described.

In testimony that I claim the foregoing as my own I have hereto affixed my signature in presence of two witnesses.

JOHN E. KLEIN.

Witnesses:
G. W. WEEKS,
J. P. MARTINDALE.